(12) United States Patent  
Knight

(10) Patent No.: US 9,420,771 B1
(45) Date of Patent: Aug. 23, 2016

(54) CRAB TRAP AND METHOD OF OPERATION THEREOF

(71) Applicant: George B. Knight, Columbia, MD (US)

(72) Inventor: George B. Knight, Columbia, MD (US)

( * ) Notice: Subject to any disclaimer, the term of this patent is extended or adjusted under 35 U.S.C. 154(b) by 140 days.

(21) Appl. No.: 14/273,274

(22) Filed: May 8, 2014

Related U.S. Application Data

(60) Provisional application No. 61/820,975, filed on May 8, 2013.

(51) Int. Cl.
*A01K 69/10* (2006.01)
*A01K 79/00* (2006.01)

(52) U.S. Cl.
CPC .............. *A01K 69/10* (2013.01); *A01K 79/00* (2013.01)

(58) Field of Classification Search
CPC ........ A01K 69/06; A01K 69/08; A01K 69/10
USPC ........ 43/102, 105; 119/474, 498; 220/6, 4.28, 220/4.33
See application file for complete search history.

(56) References Cited

U.S. PATENT DOCUMENTS

| | | | | |
|---|---|---|---|---|
| 1,383,992 A * | 7/1921 | Masek | ................... | A01M 23/00 43/105 |
| 2,821,047 A * | 1/1958 | Ruiz | ...................... | A01K 69/06 43/102 |
| 2,918,749 A * | 12/1959 | Portner | ................... | A01K 69/06 43/102 |
| 3,867,782 A * | 2/1975 | Ortiz | ....................... | A01K 69/08 43/105 |
| 3,950,885 A | 4/1976 | Simeti | | |
| 4,044,493 A | 8/1977 | Fox | | |
| 4,416,082 A * | 11/1983 | Strobel | ................... | A01K 69/06 43/102 |
| 4,554,760 A | 11/1985 | Ponzo | | |
| 4,765,088 A | 8/1988 | Stuart | | |
| 5,353,541 A * | 10/1994 | Jonason | ................. | A01K 69/10 43/100 |
| 5,625,978 A | 5/1997 | Streeper et al. | | |
| D401,994 S | 12/1998 | Whalley | | |
| 6,195,931 B1 * | 3/2001 | Johnson | ................. | A01K 69/10 43/100 |
| D466,964 S | 12/2002 | Jolliffe | | |
| D494,653 S | 8/2004 | Long | | |

* cited by examiner

*Primary Examiner* — Marc Burgess
(74) *Attorney, Agent, or Firm* — Arent Fox LLP

(57) ABSTRACT

A crab trap designed to fully open when lowered into a water body and slack is taken on the attached line. The trap includes a wire or other mesh base with hinged overlapping wire or other mesh sides. Each side overlaps the base, and once opened, each side will not extend beyond the horizontal position. One or more sides are segmented with one or more additional overlapping sides that further extend the sides in the open position. These segmented sides are designed to close sequentially from outside to inside into an enclosed trap when tension is applied to an attached line. Torsion springs or other biasing features at the hinge edges provide a force that opens the sides and also allows for the sides to be folded flat onto the base for transportation or storage.

20 Claims, 10 Drawing Sheets

CRAB TRAP AND METHOD OF OPERATION THEREOF

This application claims priority to U.S. Patent Application No. 61/820,975, titled "Crab Trap," filed on May 8, 2013, the entirety of which is hereby incorporated herein by reference.

FIELD

Aspects of the invention relate to a trap for catching waterborne creatures, such as crabs and other crustaceans, and to methods of operation of the same.

BACKGROUND OF THE TECHNOLOGY

There are a wide variety of traps available for both recreational and commercial crabbing activities. The related art includes two main types of traps: 1) an enclosed structure that provides limited entry and interior elements that prevent crabs from escaping once they have entered (also interchangeably referred to herein as "crab pots"); and 2) a manually operated trap that encloses crabs when retrieved. One main difference between these two types of traps is that crabs that feed on the bait of manually operated traps are often able to escape the trap if it is not manually closed when a crab is in the trap. Manually operated traps are preferred by recreational crabbers due to their smaller size and legal limitations on the recreational use of crab pots.

A common type of manually operated crab trap in the related art is a wire crab trap with hinged sides or doors. Several types of these related art traps are known, having varying features. One type is basically square footprint wire trap with four hinged sides, such as is shown in U.S. Pat. No. 4,044,493. This trap design has been altered in a number of caes, for example, in U.S. Pat. Nos. 4,554,760; 5,625,978; 4,765,088; D401,994; D466,964; and D494,653. One drawback of this type of trap is that it is often prone to malfunction due to opening sides extending beyond the horizontal position. These traps also tend to have gaps between the closing sides during retrieval, allowing enclosed crabs the opportunity for a quick escape. Further, Some of these traps do not fully collapse for transportation or storage without incorporating some level of de-construction to do so.

Another crab trap design utilizes multi-paneled closing sides (see, e.g., U.S. Pat. No. 3,950,885) that are triangular in shape and close into a central pillar. One drawback of this design is that the central pillar and lines that are attached to the center of each side provide obstructions for the crabs, which may become entangled in the ropes and/or discouraged by the central pillar while approaching the bait. This design also develops gaps during the closure process, providing crabs with the opportunity to escape during closure.

It is against this background that aspects of the presented invention have been developed.

SUMMARY OF THE INVENTION

Aspects of the present invention provide, among other things, a trap that overcomes the shortcomings of the related art. An example aspect includes use of overlapping panels that allow easy closure, yet that will not extend beyond an approximately horizontal position when in an open position.

Another example aspect includes segmented side panels that operate with ropes, lines, and/or other similar features (such ropes, lines, or other similar features also interchangeably being referred to herein as "connecting lines") and other mechanisms, such as one or more line receiving openings, to sequentially close from outside to inside, thereby forming an enclosed structure during retrieval. A further example aspect allows the trap to fully open when deployed with ropes or other retrieval lines or similar features located along the outer edges of one or more of the side panels.

A still further example aspect allows, or biases, for example, the trap to fold flat for transportation and storage, thereby, among other things, reducing effort and space needed to keep and use numerous traps.

The drawings contained herein detail a four sided example implementation in accordance with aspects of the present invention, attention being called to the fact, however, that the drawings are illustrative only and that changes may be made in the specific construction illustrated and described within the scope of the appended claims.

Additional advantages and novel features relating to aspects of the present invention will be set forth in part in the description that follows, and in part will become more apparent to those skilled in the art upon examination of the following or upon learning by practice thereof.

BRIEF DESCRIPTION OF THE DRAWINGS

Aspects of the present invention will become fully understood from the detailed description given herein below and the accompanying drawings, which are given by way of illustration and example only and thus not limited with respect to aspects of the present invention, wherein.

DETAILED DESCRIPTION

Figure 1:
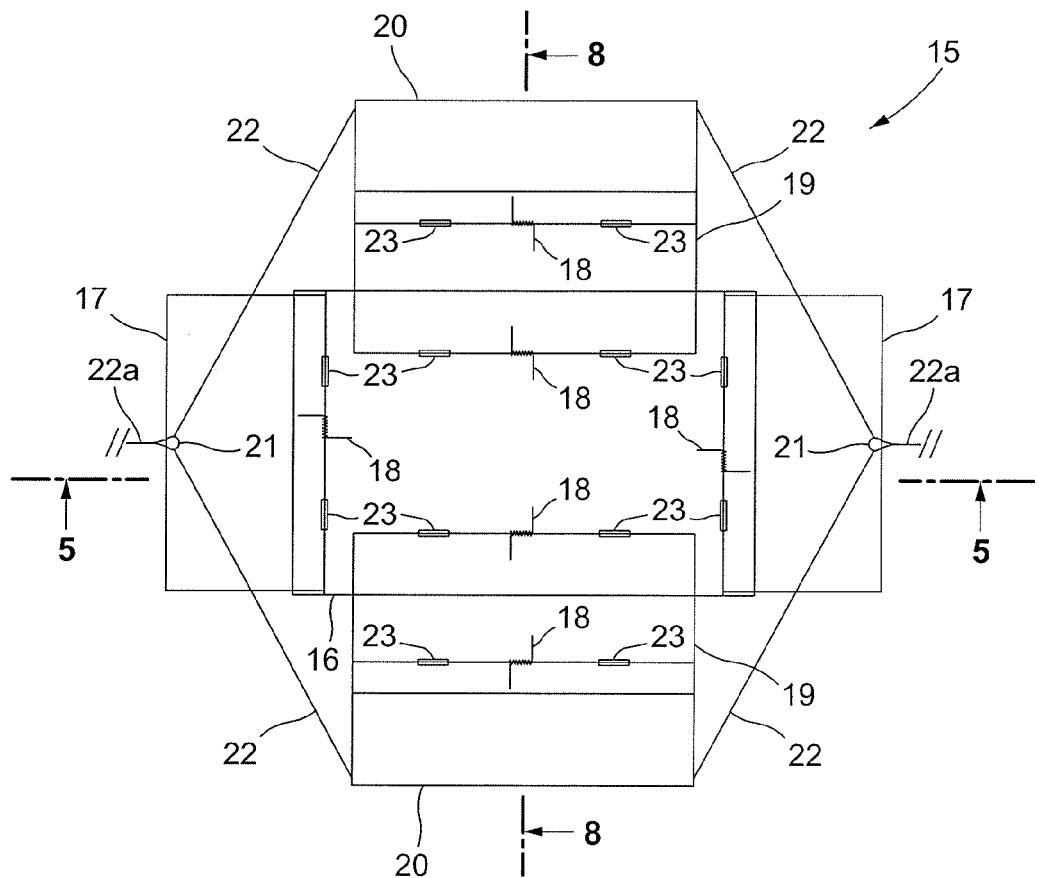
FIG. 1 presents an overhead view of an example implementation of a trap in accordance with aspects of the present invention, wherein the trap is in a fully open position.
Figure 2:
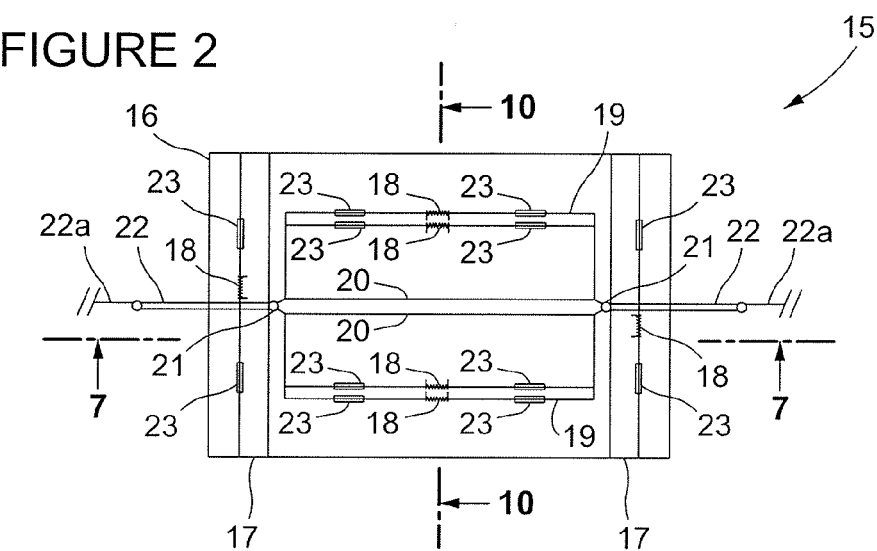
FIG. 2 shows an overhead view of the example implementation of the trap of FIG. 1 in a fully closed position.

In the drawings, like reference characters denote like elements throughout the several views. FIGS. 1 through 10 illustrate an example trap 15, in accordance with aspects of the present invention, having of a base 16 (which base 16 may, for example, have a generally flat profile with a planar direction therethrough) that has four outer edges, a first pair of hingeably attached overlapping opposing side panels 17 (which panels 17 each may, for example, have a generally flat profile with a planar direction therethrough) with torsion springs or other biasing features 18, which facilitate opening of the side panels 17, and a second pair of hingeably attached overlapping opposing side panels, which each may include segmented portions 19 and 20 (segmented portions 19 each having for example, have a generally flat profile with a planar direction therethrough, also interchangeably referred to herein as "inner segmented portions"; and segmented portions 20, which each may, for example, have a generally flat profile with a planar direction therethrough, also interchangeably referred to herein as "outer segmented portions). The second pair of side panels also each may have torsion springs or other biasing features 18 that facilitate opening of each portion 19, 20 comprising the second pair of opposing side panels.

When the trap is set in the open position, as shown, for example, in FIG. 1, each side panel 17 and each of the pair of segmented side portions 19, 20 may be biased to an open position by the force applied by torsion springs or other biasing features 18 installed at the hinge edge of each moving side of the panels. The trap 15 may be further configured such that 1) side panels 17 and inner segmented side portions 19 are hinged at inner locations 23 to the base 16 and overlap the base 16; and 2) outer segmented side portions 20 overlap the inner segmented side portions 19, such that the sides panels and portions 17, 19, 20 will open flat but cannot extend beyond the horizontal position when the trap 20 is in an upright orientation (e.g., the "overlap" between the panels/portions 17, 19, 20 with the base 16 prevents pivot of the panels/portions 17, 19, 20 about hinges 23 past approximately a parallel orientation relative to the base 23).

Further, the trap 15 includes a ring or other attached channeling feature (also interchangeably referred to herein as a "line receiving opening") 21 attached to each of the pair of opposed side panels 17, through which pull strings, lines, or other similar features 22 may be passed, each of the connecting lines 22 being attached at one of its ends to one of the opposing outer segmented side portions 20.

Figure 1A:
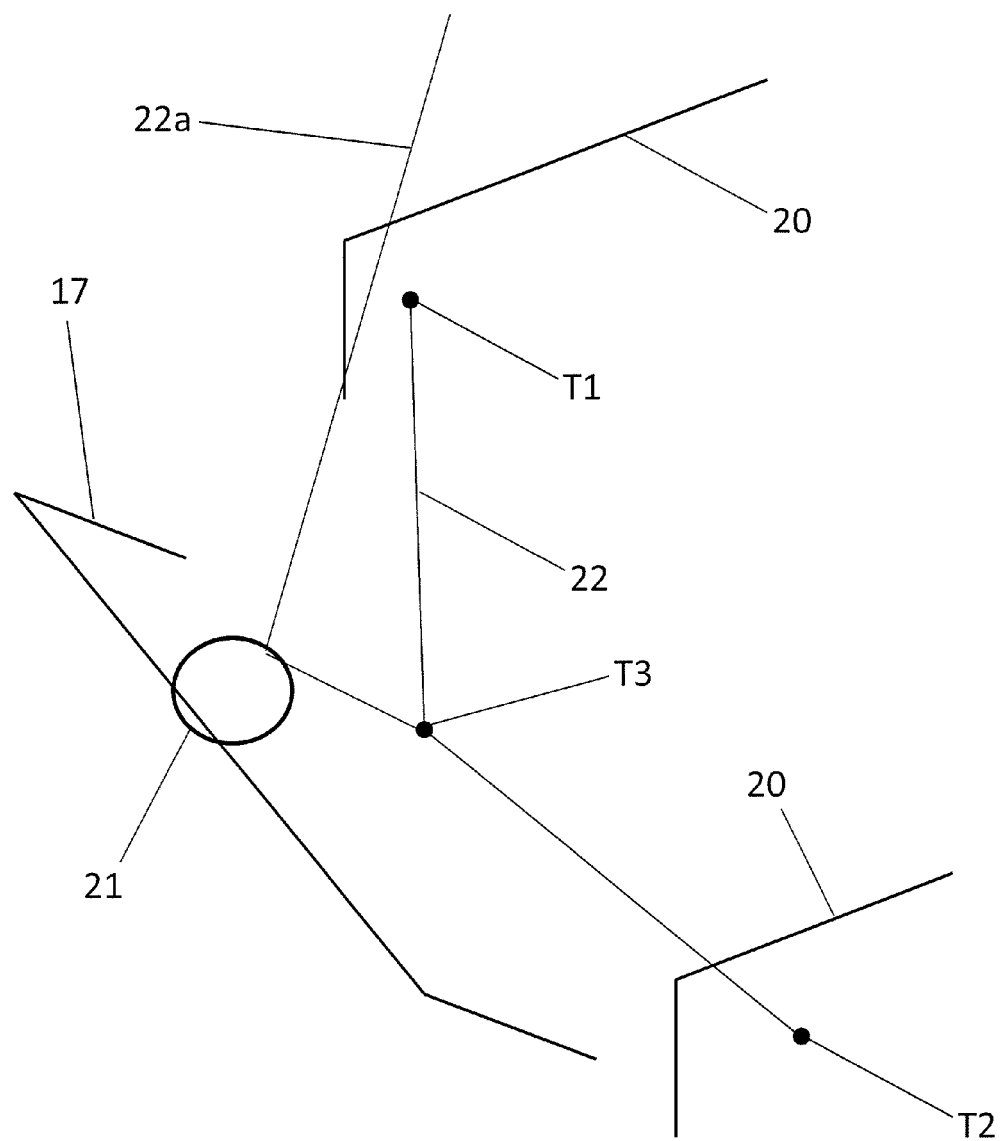
FIGS. 1A and 1B show close up views of a portion of the example trap of FIG. 1, highlighting aspects of the line portions operable with the side panels via a channeling feature, in accordance with aspects of the present invention.
Figure 1B:
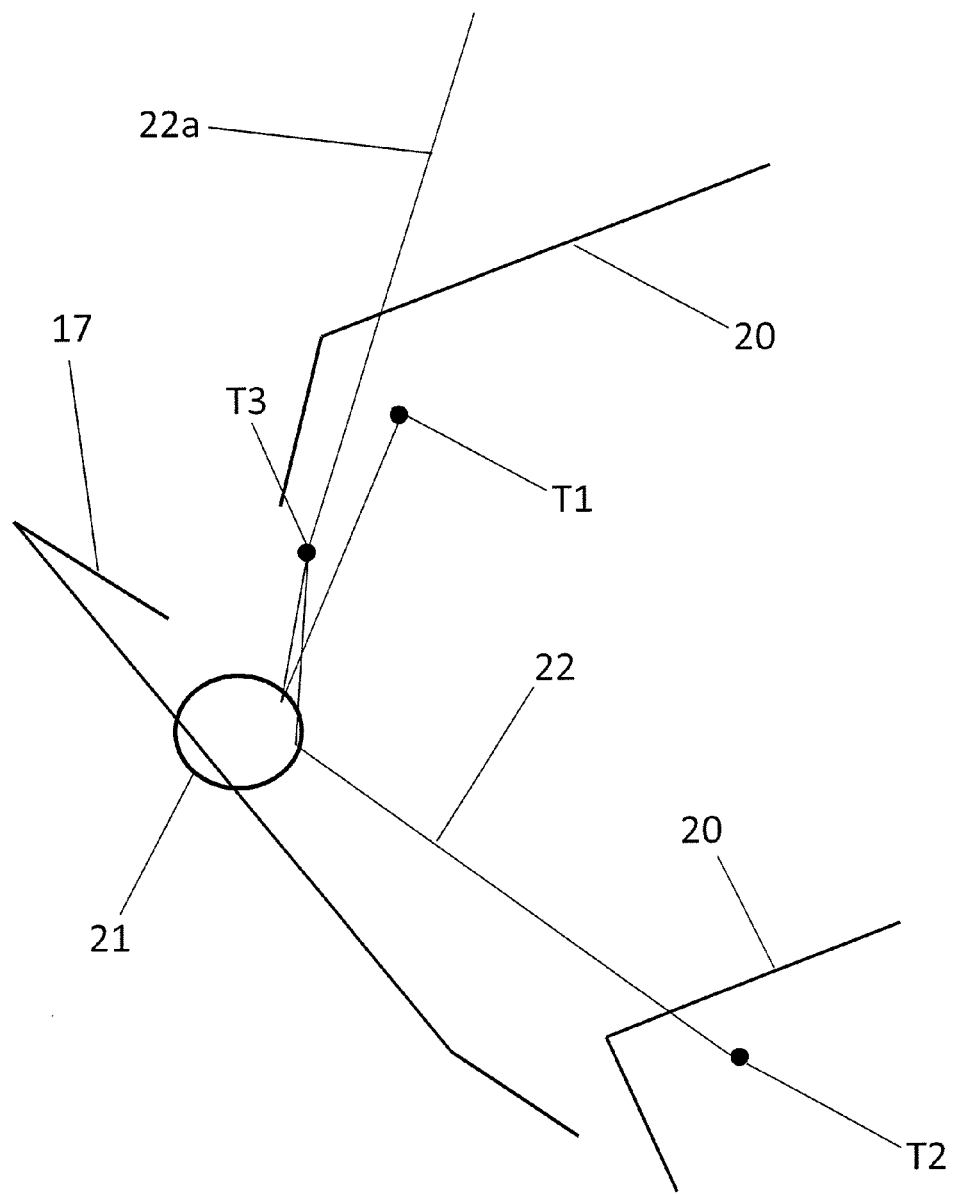
Figure 3:
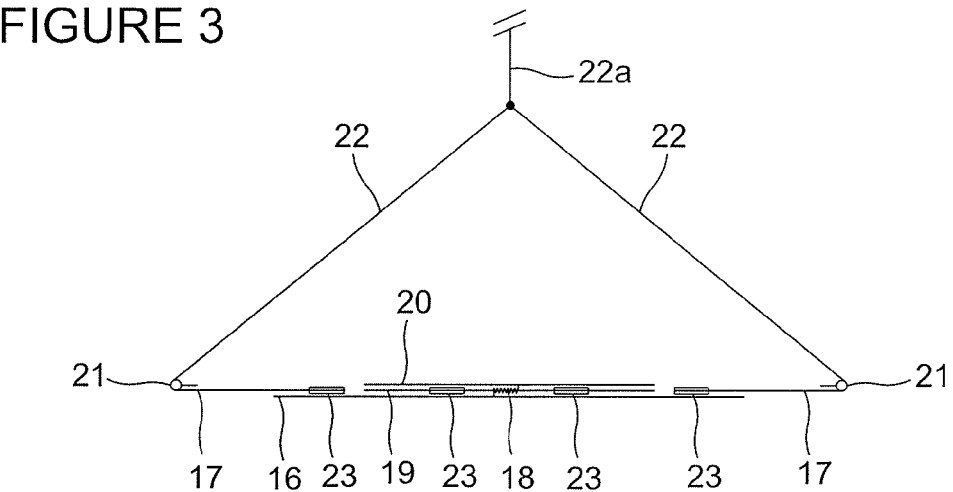
FIG. 3 shows a side view of the example implementation of FIG. 1, the trap being oriented in a fully open position (as shown in closed view in FIG. 2)
Figure 4:
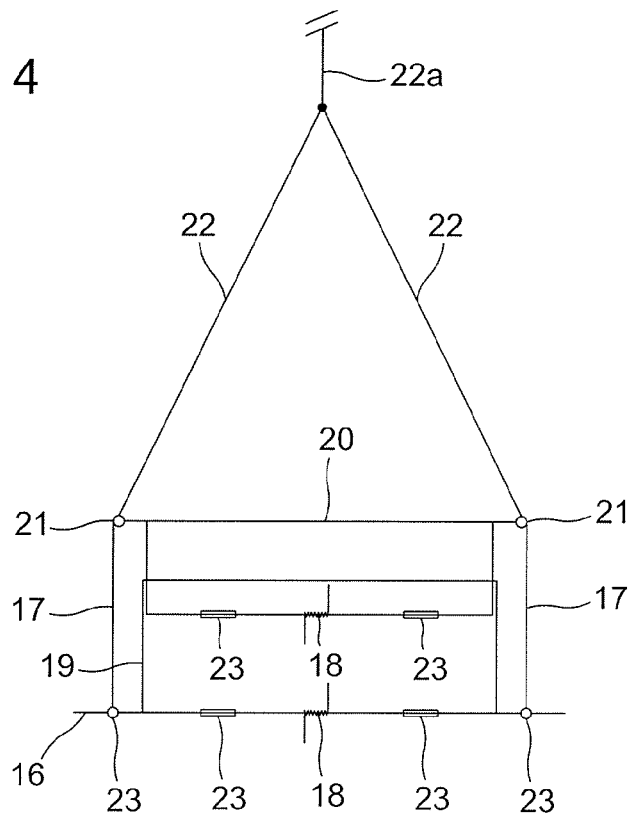
FIG. 4 contains a side view of the example implementation of FIG. 1, the trap being oriented in a fully closed position (as shown in overhead view in FIG. 2)

As further shown in closeup in FIGS. 1A and 1B for a portion of the trap 15 of FIG. 1, in one variation, each connecting line 22 may be attached at each end to one of the side portions 20 at, for example, attachment points T1, T2. Connected to connecting line 22, such as at attachment point T3, may be an intermediary line 22a. As shown, for example in FIG. 4, a pair of intermediary lines 22a may be, in turn, connected to single line 22b, so as to enable force applied on line 22b to be transmitted to the pair of lines 22a, and then to the pair of lines 22. In FIG. 1A, the attachment point T3 and all of the connecting line 22 are shown on the side of the channeling feature 21 toward the side portions 20 (i.e., do not extend into or through the channeling feature 21). In FIG. 1B, the attachment point T3 and a portion of the connecting line 22 is shown as pulled through the channeling feature 21.

Figure 5:
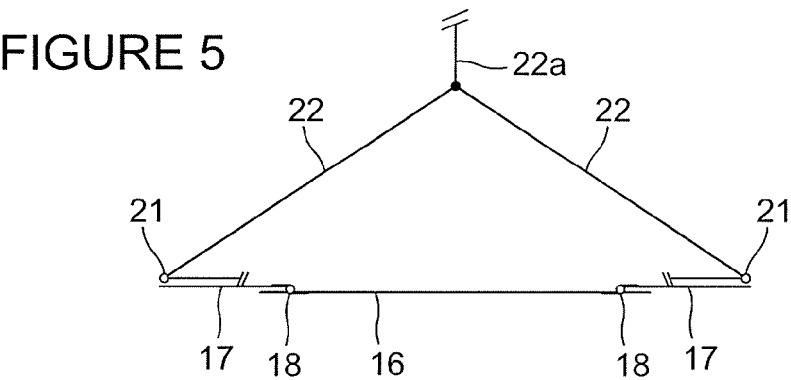
FIG. 5 presents a cross sectional view of the example implementation of FIG. 1, shown in the fully open position, along the line 5-5 of FIG. 1.
Figure 6:
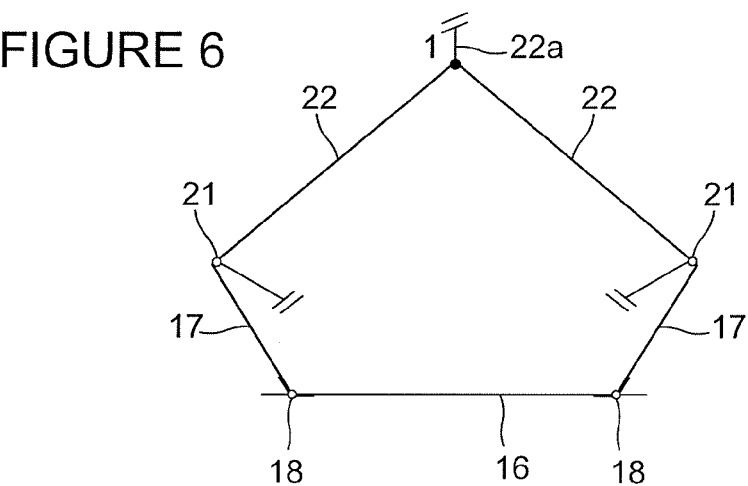
FIG. 6 presents a cross sectional view of the example implementation of FIG. 1, shown in a partially closed position in transition between the positions shown in FIG. 5 and FIG. 7.
Figure 7:
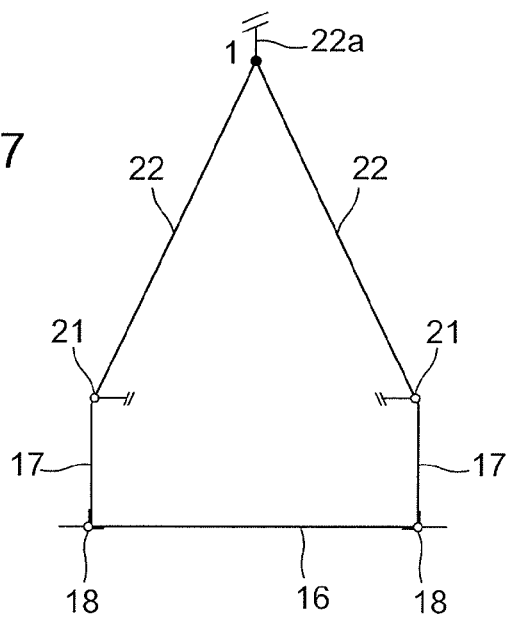
FIG. 7 presents a cross sectional view of the example implementation of FIG. 1, shown in the fully closed position along the line 7-7 of FIG. 2.
Figure 8:
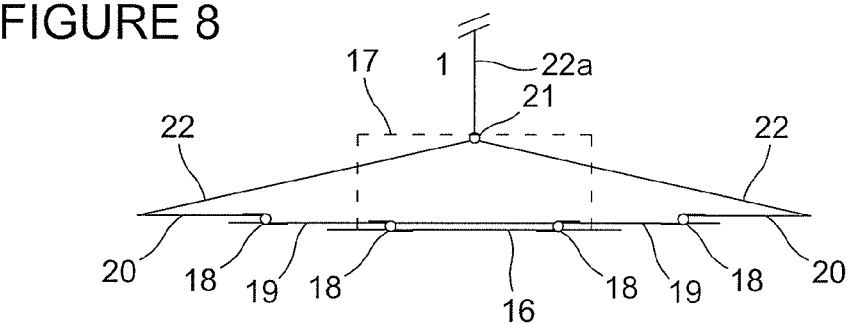
FIG. 8 presents a cross sectional view of the example implementation of FIG. 1, the trap being oriented in a fully open position, along the line 8-8 in FIG. 1
Figure 9:
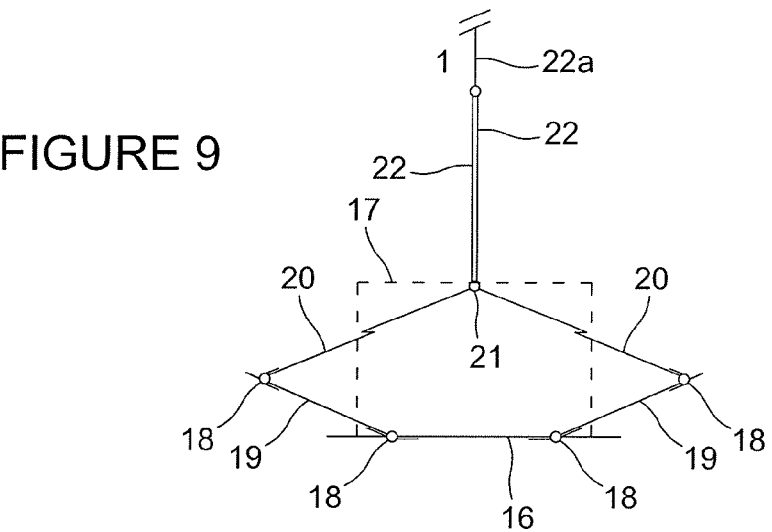
FIG. 9 presents a cross sectional view of the example implementation of FIG. 1, the trap being oriented in a partially closed position in transition between the positions shown in FIG. 8 and FIG. 10.
Figure 10:
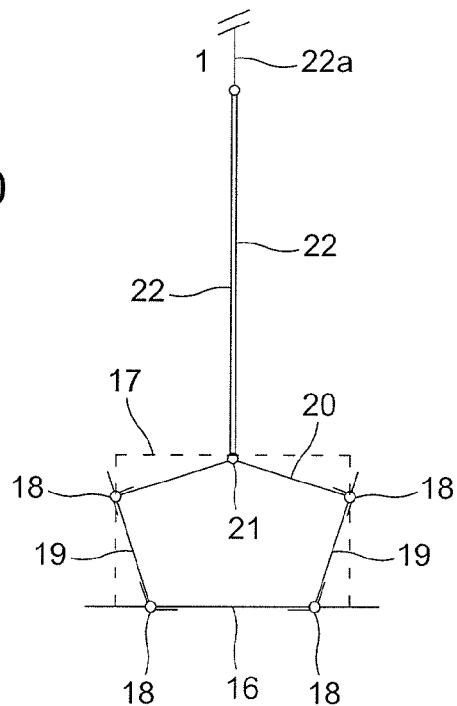
FIG. 10 presents a cross sectional view of the example implementation of FIG. 1, the trap being oriented in a fully closed position taken along line 10-10 in FIG. 2.
Figure 11:
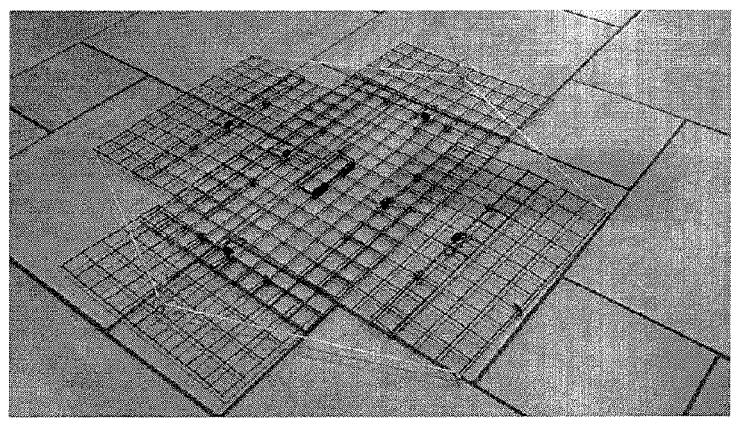
FIGS. 11-18 contain Photostat views of an example trap and various portions thereof, in accordance with aspects of the present invention.
Figure 12:
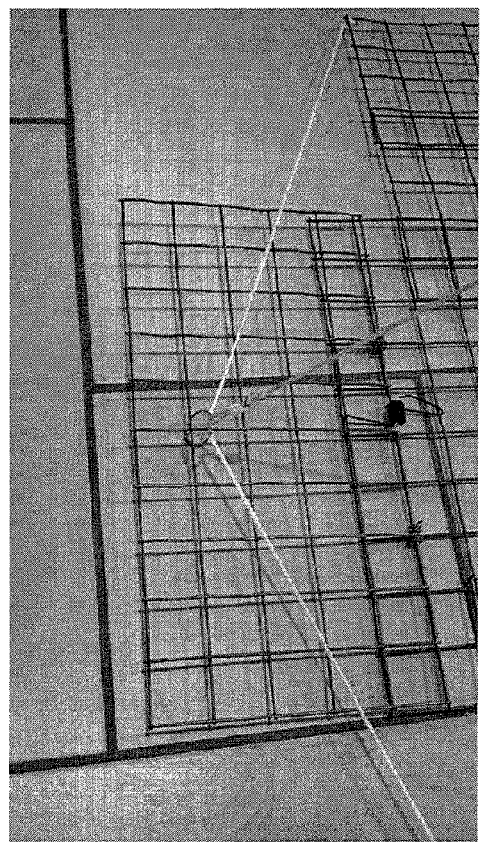
Figure 13:
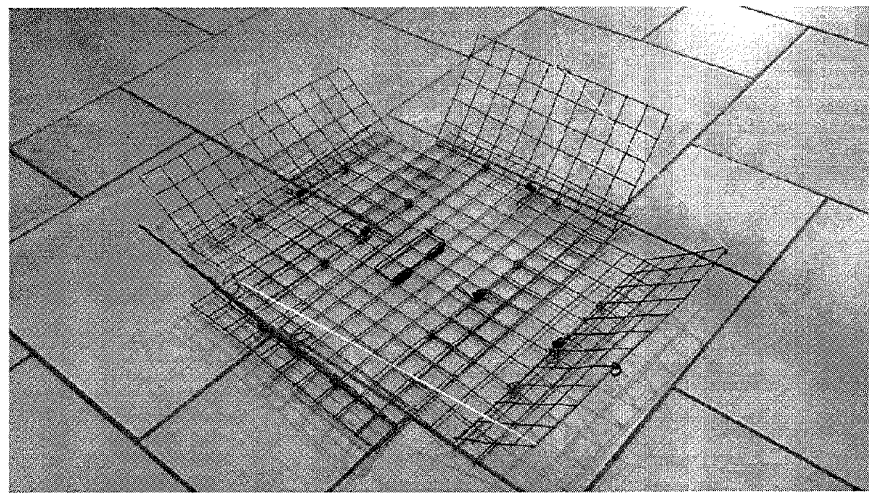
Figure 14:
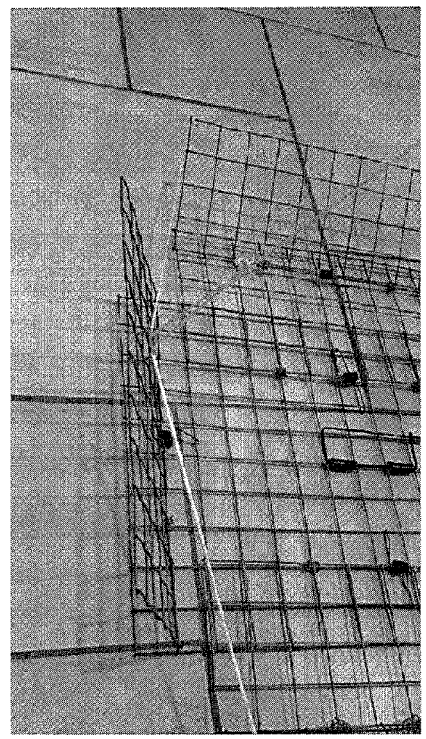
Figure 15:
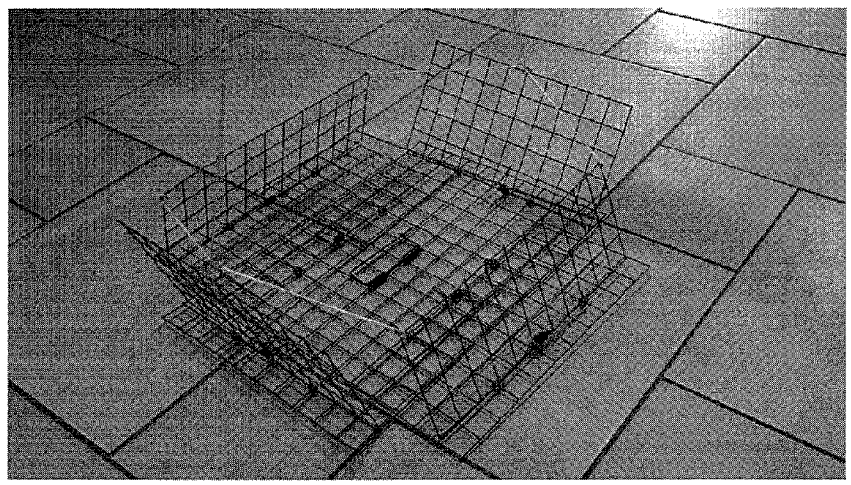
Figure 16:
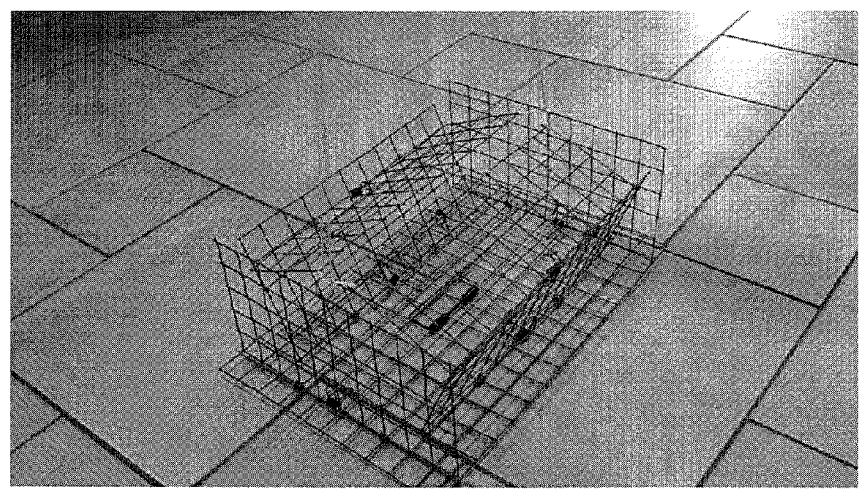
Figure 17:
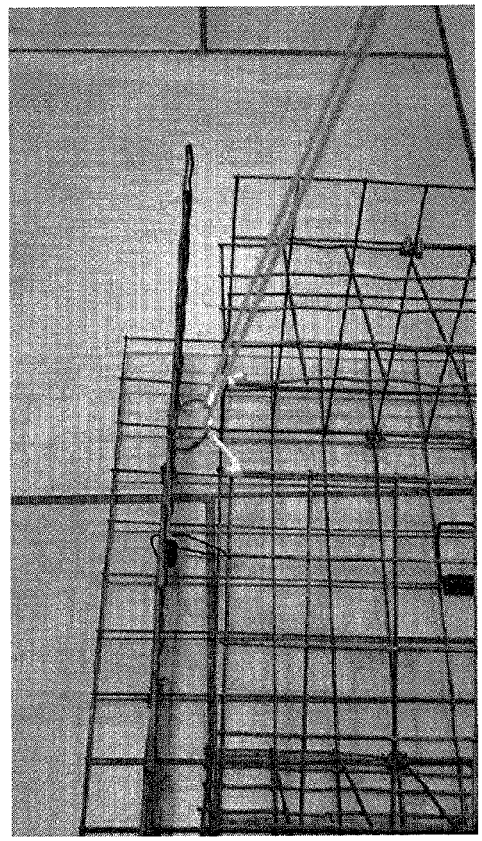
Figure 18:
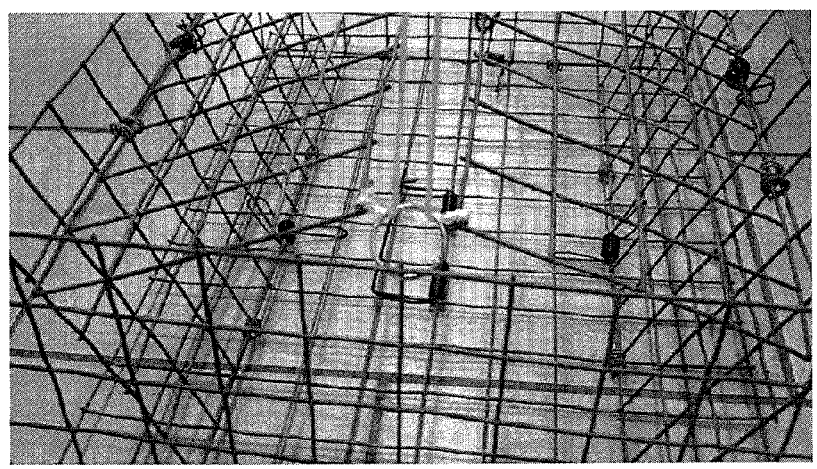

In operation, force (e.g., applied to single line 22b held by the user) transmitted through the pair of intermediary lines 22a and through the pair of channeling features 21 to pair of connecting lines 22 (such line 22b in combination with pair of lines 22a also interchangeably being referred to herein as a "retrieval line" and/or "retrieval lines") may be applied so as to initiate closing of the trap 15, which force in turn causes the two opposing side panels 17 to begin folding into a closure position for the trap 15, while contemporaneously pulling the outer segmented side portions 20, so as to begin further closure of the trap 15 via closing of these portions 20, as shown in side view in FIGS. 5, 6, and 7. As continued force is applied, and the side panels and side portions 17, 20 pivotably move, lines 22a and attached lines 22 will begin to pass through channeling features 21, and the inner segmented side portions 19 will also begin to close the trap 15, as the outer segmented side portions 20 continue to close, until each corner of the segmented side panels 20 converges (see FIGS. 9 and 10) at a closure point (e.g., at attachment point of the channeling features 21), which is centrally located on the respective side panels 17, thus completing a closed enclosure, and/or trapping any crabs enticed within the trap 15. Views of an example trap and various portions thereof are shown in attached Photostats contained in FIGS. 11-18

Among other things, the torsion springs 18 bias each side panel 17 and each of the inner segmented side portions 19 towards a position such that the planar direction of each of the panels 17 and portions 19 are approximately parallel to the planar direction of the base panel 16, and bias the outer segmented portions 20 toward a position such that the planar direction of the base panel 16 is generally approximately parallel to the planar direction of the inner segmented panels 19. The trap 15 is therefore designed with torsion springs 18 that allow the outer segmented side panels 20, the inner segmented side panels 19, and the side panels 17 to fold inward and flat against the base panel 16, for example, to reduce the amount of space need to transport and store the trap.

Side panels 17 and inner segmented side portions 19 may be hinged to the base 16, such as by using coiled metal or plastic loops 23 that extend approximately the width of the opening to limit lateral movement of the sides (e.g., motion occurring in the direction of the axis of the hinge, which is perpendicular to the pivot direction of the hinged portions). Similarly, the outer segmented side panels 20 may be hinged to the inner segmented portions 19 with similar width coiled metal or plastic loops, for example.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

The invention claimed is:

1. A trap for waterborne creatures, the trap comprising:
a base having four outer edges;
a pair of side panels hingeably attached so as to extend from a first opposite pair of the edges of the base, each of the first pair of side panels having a line receiving opening;
a pair of inner segmented side portions hingeably attached so as to extend from a second opposite pair of the edges of the base;
a pair of outer side portions, each of the pair outer side portions being attached so as to extend from an edge of one of the pair of inner segmented side portions; and a pair of connecting lines, each of the connecting lines being attached at a first end to a first one of the pair of outer side portions and attached at a second end to a second one of the pair of outer side portions, a first one of the pair of connecting lines being attachable to a first retrieving line portion extending through the line receiving opening of a first one of the pair of side panels, and the second one of the pair of connecting lines being attachable to a second retrieving line portion extending through the line receiving opening of a second one of the pair of side panels.

2. The trap of claim 1, wherein the trap is configured such that the pair of connecting lines, upon a force being applied thereto via at least one retrieving line, cooperatively operate with the base, the first pair of side panels, the pair of inner segmented side and the pair of outer side portions interoperate such that the trap moves from the first position to a second position, wherein the base, the first pair of side panels, the pair of inner segmented side and the pair of outer side portions form an enclosing container.

3. The trap of claim 2, wherein the at least one retrieving line includes at least one intermediary line and a single line attached to each of the at least one intermediary line.

4. The trap of claim 1, wherein each of the first pair of side panels is biasedly attached so as to extend from the base such that a planar direction of the side panel is parallel to a planar direction of the base.

5. The trap of claim 4, wherein each of the pair of inner segmented side portions is biasedly attached so as to extend from the base such that a planar direction of the inner segmented side portion is parallel to a planar direction of the base.

6. The trap of claim 5, wherein each of the pair of outer side portions is biasedly attached so as to extend from one of the pair of inner segmented side portions, such that a planar direction of the outer side portion is parallel to a planar direction of the inner segmented side portion.

7. The trap of claim 6, wherein the each of the first pair of side panels is biasedly attached so as to extend from the base via a spring.

8. The trap of claim 6, wherein the trap is configured such that the base, the first pair of side panels, and pair of inner segmented side portions, and the pair of outer side portions interoperate such that the trap is biased to a flat first position.

9. The trap of claim 1, wherein the pair of side panels is hingeably attached to the base via a hinge feature, the hinge feature extending so as to limit relative lateral motion therebetween.

10. A method of operating a trap, the trap including a base having four outer edges; a pair of side panels hingeably attached so as to extend from a first opposite pair of the edges of the base, each of the first pair of side panels having a line receiving opening; a pair of inner segmented side portions hingeably attached so as to extend from a second opposite pair of the edges of the base; a pair of outer side portions, each of the pair outer side portions being attached so as to extend from an edge of one of the pair of inner segmented side portions; and a pair of connecting lines, each of the connecting lines being attached at a first end to a first one of the pair of outer side portions and attached at a second end to a second one of the pair of outer side portions, a first one of the pair of connecting lines being attachable to a first retrieving line portion extending through the line receiving opening of a first one of the pair of side panels, and the second one of the pair of connecting lines being attachable to a second retrieving line portion extending through the line receiving opening of a second one of the pair of side panels, the method comprising:

emplacing the trap in a first position, in which the base, the pair of side panels, the pair of inner segmented side and the pair of outer side portions are generally in a parallel planer position;

applying a force to the trap via the first and second line retrieving portions; and the force on the first and second line retrieving portions pivotably moving the pair of side panels, the pair outer side portions, and the pair of inner segmented side portions to a second position, wherein a closed container shape is formed thereby.

11. The method of claim 10, wherein the first and second line retrieving portions include at least one intermediary line.

12. The method of claim 10, wherein the first and second line retrieving portions include a single connected line.

13. The method of claim 10, wherein each of the first pair of side panels is biasedly attached so as to extend from the base such that a planar direction of the side panel is parallel to a planar direction of the base.

14. The method of claim 13, wherein each of the pair of inner segmented side portions is biasedly attached so as to extend from the base such that a planar direction of the inner segmented side portion is parallel to a planar direction of the base.

15. The method of claim 14, wherein each of the pair of outer side portions is biasedly attached so as to extend from one of the pair of inner segmented side portions, such that a planar direction of the outer side portion is parallel to a planar direction of the inner segmented side portion.

16. The method of claim 15, wherein the each of the first pair of side panels is biasedly attached so as to extend from the base via a spring.

17. The method of claim 15, wherein wherein the trap is configured such that the base, the first pair of side panels, and pair of inner segmented side portions, and the pair of outer side portions interoperate such that the trap is biased to a flat first position.

18. A trap for waterborne creatures, the trap comprising:
a base having four outer edges;
a first pair of side panels hingeably attached so as to extend from a first opposite pair of the edges of the base, each of the first pair of side panels having a line receiving opening;
a second pair of side panels hingeably attached so as to extend from a second opposite pair of the edges of the base;
a pair of connecting lines, each of the connecting lines being attached at a first end to a first one of the second pair of side panels and attached at a second end to a second one of the second pair of side panels, a first one of the pair of connecting lines being attachable to a first retrieving line portion extending through the line receiving opening of a first one of the pair of side panels, and the second one of the pair of connecting lines being attachable to a second retrieving line portion extending through the line receiving opening of a second one of the pair of side panels.

19. The trap of claim 18, wherein each of the second pair of side panels includes an inner side portion hingeably attached to the base and an outer side portion hingeably attached to the inner side portion.

20. The trap of claim 19, further comprising a plurality of biasing mechanisms, at least one of the plurality of biasing mechanisms being operably engaged between the first pair of side panels and the base, between each of the inner side portions and the base, and between each of the outer side portions and the attached inner side portion.

\* \* \* \* \*